United States Patent [19]

Shore

[11] Patent Number: 4,594,938
[45] Date of Patent: Jun. 17, 1986

[54] PRESSURE RELIEVED PISTON ROD SEAL

[75] Inventor: Daniel B. Shore, Moline, Ill.

[73] Assignee: J. I. Case Company, Racine, Wis.

[21] Appl. No.: 634,717

[22] Filed: Jul. 26, 1984

[51] Int. Cl.⁴ .............................................. F15B 21/04
[52] U.S. Cl. .......................................... 92/82; 92/86; 92/168
[58] Field of Search ................... 92/82, 86, 168, 165 R; 277/24, 59

[56] References Cited

U.S. PATENT DOCUMENTS

| 3,293,994 | 12/1966 | Napolitano | 92/82 |
| 3,334,906 | 8/1967 | Arnold | 92/82 |
| 3,869,963 | 3/1975 | Schindel | 92/86 |
| 3,943,717 | 3/1976 | Schexnayder | 92/86 |
| 4,036,112 | 7/1977 | Hübschmann | 92/82 |
| 4,055,107 | 10/1977 | Bartley | 92/168 |
| 4,476,772 | 10/1984 | Gorman | 92/168 |

FOREIGN PATENT DOCUMENTS 2161723  6/1973  Fed. Rep. of Germany .......... 92/82

Primary Examiner—Abraham Hershkovitz
Attorney, Agent, or Firm—Cullen, Sloman, Cantor, Grauer, Scott & Rutherford

[57] ABSTRACT

A pressure relieved piston rod seal for piston-cylinder having tandem seals around the piston rod which are subject to failure when the pressure between the seals is greater than the pressure in the cylinder chamber. The piston rod seal of this invention solves this problem by providing a unidirectional seal between the end or low pressure rod seal and the cylinder chamber which relieves the pressure between the seals while sealing the chamber. The unidirectional seal includes a fluid passage which permits fluid flow into the cylinder chamber when the pressure between the seals is greater than the pressure in the cylinder chamber and seals the cylinder bore when the pressure in the chamber is greater than the pressure between the seals.

12 Claims, 6 Drawing Figures

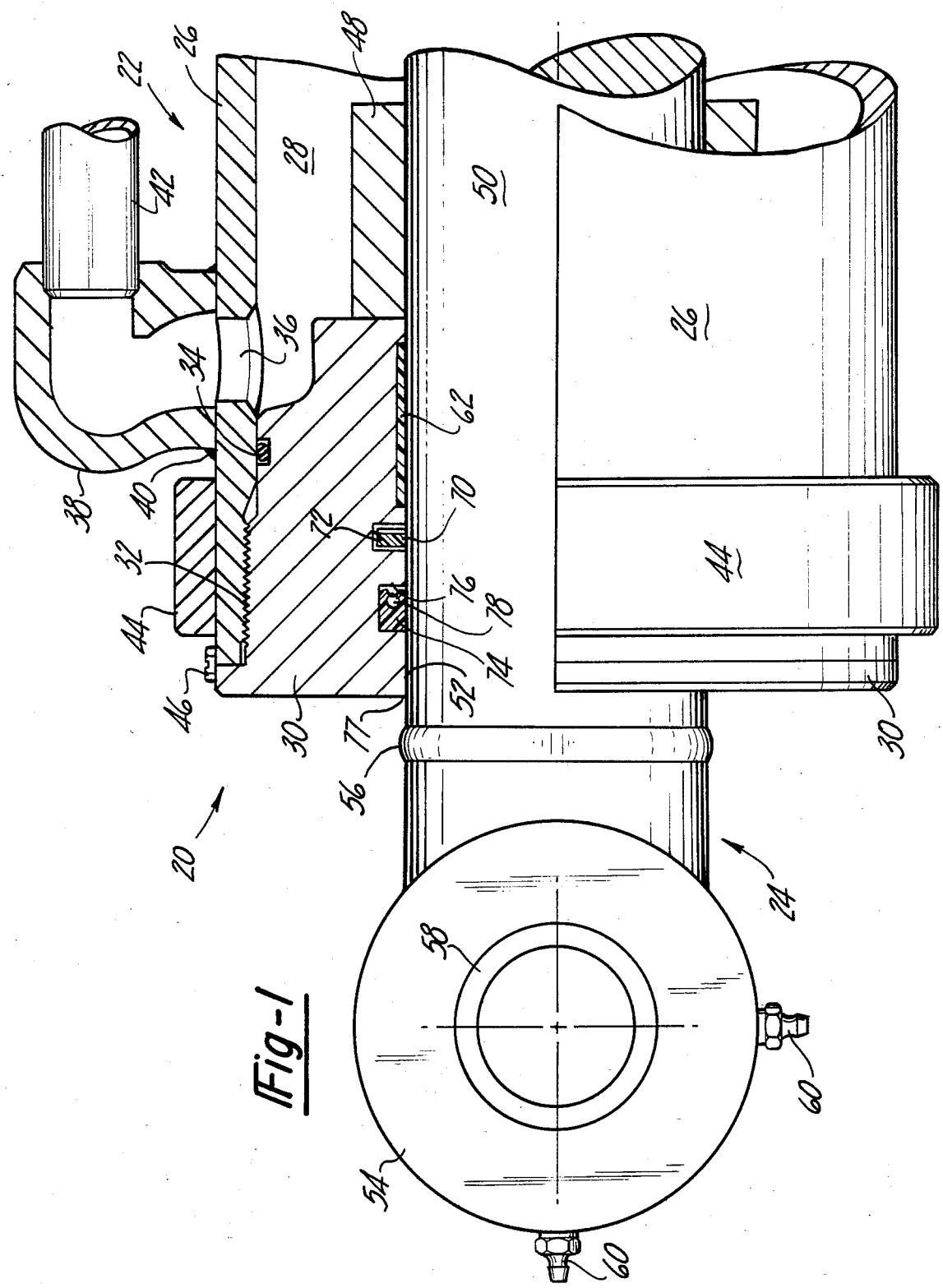

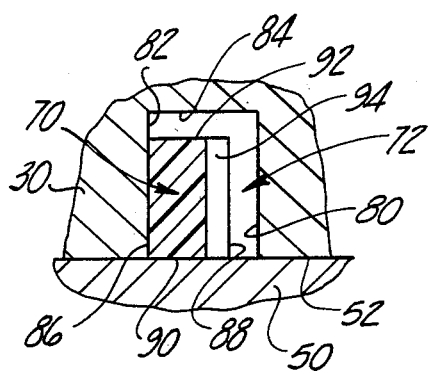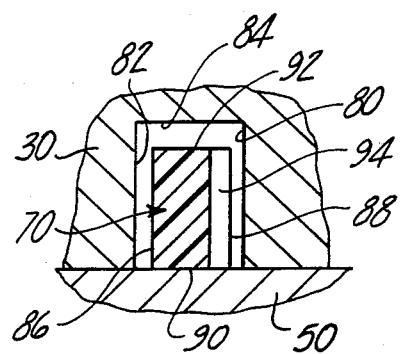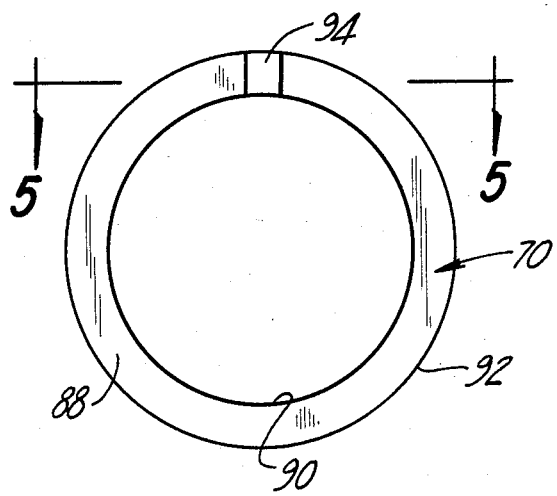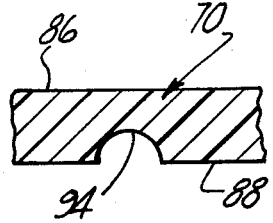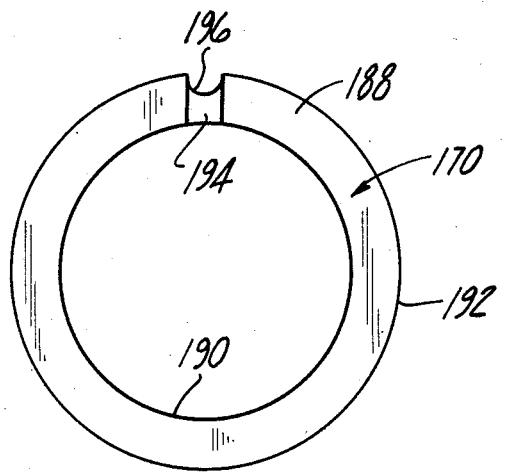

PRESSURE RELIEVED PISTON ROD SEAL

FIELD AND BACKGROUND OF THE INVENTION

A pressure relieved piston rod seal for piston cylinders having tandem or multiple rod seals.

Hydraulic cylinders, for example, normally include a hydraulic cylinder having a pressure chamber and a piston having a head portion reciprocal in the cylinder chamber and a rod portion extending out of the cylinder through a bore generally including multiple annular rod seals. Various improvements have been made in the rod seals, however, the seals are still subject to failure from aging, frictional war and heat. In theory, the low pressure or redundant seal continues to seal the cylinder bore when the first or high pressure seal fails, however, it has been discovered that the use of multiple seals may actually contribute to the failure of the rod seals, as described herein.

Reciprocation of the piston rod portion in the cylinder bore results in heating of the sealing rings and the hydraulic fluid trapped in the channels enclosing the seals and between the seals around the piston rod. This heating results in expansion of the seals and the hydraulic fluid. The fluid pressure between the seals in the cylinder bore will, at times, exceed the pressure in the cylinder chamber. When this pressure exceeds the elastic limit of the seals, the seals fail. In the examination of such failures, it has been discovered that the high pressure seal closest to the pressure chamber is extruded between the piston rod and the cylinder bore toward the cylinder pressure chamber and the low pressure seal is extruded toward the exterior of the bore, resulting in the failure of both seals.

This problem has been solved in the piston rods seal of the present invention by utilizing two seals operating in tandem including a unidirectional high pressure seal which relieves the fluid pressure between the seals as described hereinbelow.

SUMMARY OF THE INVENTION

The pressure relieved piston rod seal of the present invention may be utilized in any conventional fluid piston-cylinder, including hydraulic cylinders, such as utilized in the power equipment and construction industries, fluid rams and hydraulic assisted pneumatic systems. As described, the piston-cylinder includes a cylinder having a pressure chamber therein and a piston reciprocal in the cylinder chamber having a rod portion extending out of the cylinder through a bore or passage which is normally configured to closely conform to the cylinder rod. The cylinder bore of the pressure rod seal of this invention includes at least two spaced annular channels opening toward the piston rod which receive the rod seals.

As described, the preferred piston rod seal of this invention includes two rod seals operating in tandem. For convenience of description, the seal closest to the cylinder pressure chamber is somtimes referred to herein as the high pressure seal and the adjacent seal closer to the external opening of the bore or passage is sometimes referred to as the low pressure seal. It will be understood, however, that the piston-cylinder may include additional seals, particularly between the low pressure seal and the external opening of the cylinder bore. The low pressure seal may be any conventional seal, however, the low pressure seal no longer acts as a redundant seal.

In the pressure relieved piston rod seal of this invention, the high pressure seal is a unidirectional seal which permits fluid flow toward the cylinder pressure chamber, around the piston rod, but prevents flow in the opposite direction. The annular channel in the cylinder bore which contains the high pressure seal preferably includes opposed side walls and a bottom wall which contains the seal and the high pressure seal is preferably a resilient annular sealing ring having an internal face bearing in sealed relation against the piston rod portion, of the high pressure seal for sealing the piston rod. In the preferred embodiment, the sealing ring has a width which is less than the width of the channel measured between the side walls, such that the sealing ring is able to move in the channel against either side wall upon movement of the piston rod and in response to the fluid pressure. The side face of the sealing ring adjacent the low pressure seal in the disclosed embodiment generally conforms to the adjacent side wall of the channel to seal fluid flow toward the low pressure seal. The sealing ring also includes a fluid passage means which provides communication between the side face of the ring adjacent the low pressure seal and the opposed side face at the internal face, permitting unidirectional fluid flow toward the cylinder chamber.

In the most preferred embodiments of the piston rod seal of this invention, the sealing ring of the high pressure seal includes a radial groove or channel in the side face of the ring adjacent the cylinder chamber. In one embodiment of the invention, the resilient sealing ring has an external diameter which is less than the internal diameter of the annular channel containing the ring in the cylinder bore, providing fluid communication around the annular seal and through the groove or channel in the side face when the pressure between the seals is greater than the pressure in the cylinder chamber. In the other disclosed embodiment of the invention, a groove or channel is provided in the top or exterior face of the ring, between the side faces, which communicates with the radial groove in the side face of the ring, providing one way fluid communication toward the cylinder pressure chamber.

The high pressure seal therefore functions as a unidirectional seal, wherein the sealing ring side face adjacent the low pressure seal seals against the adjacent side wall of the channel when the fluid pressure in the cylinder chamber is greater than the pressure between the tandem seals and the high pressure seal permits fluid flow toward the cylinder chamber when the fluid pressure between the sealing means is greater than the pressure in the cylinder chamber. Thus, the utilization of two seals in tandem, wherein the seal adjacent the cylinder chamber is a unidirectional seal, prevents any leakage of fluid out of the cylinder bore while preventing damaging build up of pressure between the seals. When the fluid pressure between the seals is greater than the pressure in the cylinder chamber, the low pressure seal prevents leakage of fluid around the piston bore and the pressure is relieved through the high pressure seal. Both seals are therefore functional and the low pressure seal no longer acts as a redundant seal.

Other advantages and meritorious features of the present invention will be more fully understood from the description of the preferred embodiments, the appended claims and the drawings, a brief description of which follows.

BRIEF DESCRIPTION OF THE DRAWINGS

FIG. 1 is a partially cross-sectioned side view of the rod end of a hydraulic piston-cylinder including one embodiment of the pressure relieved piston rod seal of this invention;

FIG. 2 is an enlarged view of the high pressure piston rod seal shown in FIG. 1 in the sealed position;

FIG. 3 is a partial cross-sectional view of the high pressure rod seal shown in FIGS. 1 and 2 in the open position;

FIG. 4 is a side view of the high pressure seal shown in FIGS. 1 to 3;

FIG. 5 is a partial top cross-section of the high pressure seal shown in FIG. 4, in the direction of view arrows 5—5; and FIG. 6 is a side view of an alternative embodiment of the high pressure seal.

DESCRIPTION OF THE PREFERRED EMBODIMENTS

As stated above, the pressure relieved piston rod seal of this invention may be utilized in any conventional piston-cylinder, such as the hydraulic piston-cylinder 20 as shown in FIG. 1. The disclosed embodiment of the hydraulic cylinder 20 includes a cylinder, indicated generally at 22, and a piston indicated generally at 24. The cylinder includes a tube 26, which encloses a pressure chamber 28. The end of the tube is enclosed at the rod end with a gland 30 which includes an externally threaded portion 32 threadably received in the end of the tube 26 and which includes an O-ring seal 34.

The tube 26 includes a bore or port 36 which communicates with the pressure chamber 28, as shown, and a hydraulic port fitting 38 is secured to the tube 26 by any suitable means, such as welding, as shown at 40. A hydraulic line or tube 42 is received in and secured to the port fitting 38, such that hydraulic pressure may be supplied to the pressure chamber 28 through line 42. The disclosed embodiment of the piston-cylinder includes a reinforcing ring 44 which may be secured over the tube 26 by shrink fitting. A set screw 46 prevents unthreading of the tube 26 and gland 30. The disclosed embodiment of the piston-cylinder also includes a spacer 48 which is telescopically received over the piston rod portion and which limits the travel of the piston but forms no part of the present invention.

The piston 24 includes a cylindrical rod portion 50 which is reciprocal in the cylinder bore 52 defined in the gland 30. The disclosed embodiment of the piston includes an eye 54, which is welded at 56 to or formed integral with the piston rod 50. As will be understood by those skilled in the art, the piston rod eye 54 is utilized to pivotally attach the piston rod to another member, such as the moveable component of a construction machine. The piston rod eye normally includes a bushing 58 and grease fittings 60 for lubricating the bushing. In the disclosed embodiment of the piston-cylinder, the piston bore 52 includes a friction resistant bearing 62, which may be a nylon sleeve or the like.

As will be understood, FIG. 1 illustrates only the rod end portion of the piston-cylinder because the remaining components may be conventional and do not form a part of the present invention. The piston 24 will normally include a piston head, not shown, which reciprocates in the pressure chamber 28. The movement of the piston head in the pressure chamber is limited by the spacer 48. The head end of the piston is closed to define an enclosed pressure chamber 28 and normally includes a second hydraulic port, not shown, opposite the piston head, which moves the piston head toward the spacer 48 when pressurized. Hydraulic line 42 may be pressurized to retract the piston rod as shown in FIG. 1. The head end of the piston also normally includes a bushing for attachment of the cylinder to a second component, not shown.

As described above, the piston rod seal of this invention includes two seals operating in tandem. The tandem seals include a unidirectional high pressure seal 70 located in a channel or groove 72 in the cylinder bore 52 closest to the cylinder pressure chamber 28 and a low pressure seal 74 located in an annular channel or groove 76 in the cylinder bore 52 closer to the opening 77 of the cylinder bore. The low pressure seal 74 may be a conventional piston rod seal, such as the U-shaped seal having a metal ring 78 as disclosed in FIG. 1. This type of seal is normally referred to as a loaded U-cup and may be formed of polyurethane or other suitable materials.

FIGS. 2 to 5 illustrate in more detail the high pressure seal 70 shown in FIG. 1 and the operation of the seal in the annular channel 72 in the cylinder bore 52. In the disclosed embodiment, the annular channel 72 includes opposed side walls 80 and 82 and a bottom wall 84. The disclosed embodiment of the high pressure seal is ring-shaped having side faces 86 and 88, an internal face 90, in sealing engagement with the external surface of the piston rod 50, and an external face 92. As shown in FIG. 2, the side face 86 of the sealing ring adjacent the low pressure seal closely conforms to the side wall 82 of the channel 72 for sealing the channel as shown in FIG. 2. The opposed side face 88 of the sealing ring 70 includes a radial groove, 94 which, in the disclosed embodiment, is semicircular as best shown in FIG. 5. Further, the external diameter of the sealing ring 70, measured at the external surface 92, is less than the internal diameter of the groove 72, measured at the bottom wall 84. The high pressure seal therefore functions as a unidirectional seal, as now described.

The seal 70 is able to move laterally in the channel 72 because the width of the sealing ring measured between the side faces 86 and 88 is less than the width of the channel 72 measured between the side walls 80 and 82. The sealing ring is preferably formed of a resilient polymeric material, such as polyurethane and the ring is press fitted on the piston rod portion 50. The sealing ring 70 will therefore move laterally in the channel 72 in response to the pressure differential at the opposed side faces of the sealing ring and the longitudinal movement of the piston rod portion 50. When the fluid pressure in the cylinder chamber 28 is greater than the fluid pressure between the seals, the pressure reacts against side face 88 of the seal and the sealing ring is moved to the position shown in FIG. 2. In this position, the channel 72 is sealed, preventing escape of fluid around the piston rod to the low pressure seal. As described above, the reciprocal movement of the piston rod portion 50 relative to the resilient seals 70 and 74 creates heat, expanding the polymeric seals and the hydraulic fluid. Pressure then builds up between the high and low pressure seals and when this pressure exceeds the elastic limit of the seals, the seals are damaged or destroyed. In the piston rod seal of this invention, however, the pressure between the seals is relieved, as follows. When the pressure between the seals exceeds the pressure in the cylinder chamber 28, the pressure reacts against side face 86 of the sealing ring 70 moving the sealing ring to the position shown in FIG. 3. The hydraulic fluid is now able to circulate around the sealing ring and through radial channel or groove 94 to escape to the cylinder chamber. Under extreme conditions, the sealing ring is moved against channel side wall 80, however, the groove 94 maintains fluid communication with the cylinder chamber. Fluid pressure build-up between the seals is thus relieved, avoiding damage to the seals.

FIG. 6 illustrates an alternative embodiment of the high pressure seal. The seal 170 may have a greater external diameter at exterior surface 192 to fill the radial channel 72 in the cylinder bore. In addition to the radial groove 194 inside face 188, the embodiment of the sealing ring 170 shown in FIG. 6 includes a second groove 196 through the external face 192, between the side faces, which communicates with the radial groove 194. As will be understood, the combination of grooves, 194 and 196, provides the same fluid communication described above in regard to FIGS. 2 to 5. That is, the sealing ring 170 will seal against the side wall 82 of the channel 72 adjacent the low pressure seal when the pressure in the cylinder chamber exceeds the fluid pressure between the seals and the sealing ring is located in the position shown in FIG. 2. However, when the pressure between the seals exceeds the fluid pressure in the cylinder chamber 28, the sealing ring is moved toward the cylinder pressure chamber, as shown in FIG. 3, and the grooves 194 and 196 provide fluid communication through the seal 170 to relieve the pressure between the seals, as described above. The sealing ring 170 may also be formed of any suitable resilient material, such as polyurethane.

As will be understood, the disclosed embodiments of the piston-cylinder and pressure relieved piston rod seal of this invention may be modified within the purview of the appended claims. The piston-cylinder disclosed in FIG. 1 is only one example of the environment of the piston rod seal of this invention. Further, various modifications may be made to the disclosed embodiments of the sealing ring, 70 and 170, provided the seal provides a unidirectional fluid flow, as described above. For example, a passage may be provided through the opposed faces of the sealing ring, provided the passage communicates with the side face closest to the cylinder chamber at the surface of the piston rod to relieve the build-up of pressure between the seals. The preferred embodiments of the high pressure seal, however, include a radial groove, as described. Having described the preferred embodiments of the pressure relieved piston rod seal of this invention, I now claim the invention as follows.

I claim:

1. A pressure relieved piston rod seal for a piston-cylinder, said piston-cylinder including a cylinder having a pressure chamber therein and a piston reciprocal in said cylinder chamber having a rod portion extending out of said cylinder through a passage, said passage having an internal wall generally conforming to the exterior surface of said piston rod portion including two spaced annular channels opening toward said piston rod portion, said piston rod seal comprising a first sealing means, in a first passage channel, located relatively adjacent the external opening of said passage, bearing in sealed relation against said piston rod portion, and a second sealing means, in a second cylinder passage channel, located relatively adjacent said cylinder chamber, said second sealing means comprising a resilient annular sealing polymeric ring having an internal face bearing in sealed relation against said piston rod portion, said second annular passage channel having side walls and said sealing ring having a width which is less than the width of said second channel measured between said side walls, said sealing ring having a first side face, adjacent said first sealing means, generally conforming to the adjacent side wall of said second channel, and said sealing ring having a fluid passage means providing communication between said first side face and the opposed side face at said internal face, whereby said second sealing means functions as a unidirectional seal, wherein said sealing ring first side face seals against said channel adjacent side wall when the fluid pressure in said cylinder pressure chamber is greater than the fluid pressure between said sealing means, and said second sealing means permitting fluid flow through said passage means into said cylinder chamber, through said passage means, when the fluid pressure between said sealing means is greater than the pressure in said cylinder chamber.

2. The piston rod defined in claim 1, characterized in that said annular sealing ring of said second sealing means has an external diameter which is less than the internal diameter of said second cylinder passage channel and said ring passage means comprising a radial channel defined in said opposed side face providing fluid communication around said annular sealing ring and through said opposed side face when said ring first side face is faced from said adjacent channel side wall.

3. The piston rod seal as defined in claim 1, characterized in that said ring fluid passage means includes a radial groove in said opposed ring side face providing fluid communication through said opposed side face when said first ring side face is spaced from said adjacent channel side wall.

4. The piston rod seal defined in claim 3, characterized in that said ring fluid passage means includes a fluid passage between said side faces communicating with said radial groove.

5. The piston rod seal defined in claim 1, characterized in that said second passage channel is rectangular including said opposed side walls and a bottom wall, said annular sealing ring side faces being generally flat and parallel to said channel side walls, and said ring opposed side face including a radial channel providing fluid communciation through said opposed ring side wall.

6. The piston rod seal defined in claim 4, characterized in that said annular ring has an external diameter which is less than the internal diameter of said second passage annular channel at said bottom wall, providing communication around said annular seal and through said opposed side face radial channel when said first ring side face is spaced from said adjacent channel side wall.

7. The piston rod seal defined in claim 6, characterized in that said annular sealing ring has a width between said side faces which is less than the width of said second bore channel permitting said ring to move longitudinally within said second channel and said ring including a radial groove in said opposed side face providing fluid communication through said opposed side face.

8. A pressure relieved piston rod seal for a hydraulic cylinder, said hydraulic cylinder including a cylinder having a pressure chamber therein and a piston reciprocal in said cylinder chamber having a rod portion extending out of said cylinder through a bore, said bore having an internal wall generally closely conforming to the exterior surface of said piston rod portion and including two spaced annular channels opening toward said piston rod portion including side walls and a bottom wall, said piston seal comprising a first and second sealing means located in said bore channels functioning in tandem, said first sealing means located in a first bore channel relatively adjacent the external opening of said bore and bearing in sealed relation against said piston rod portion, and said second sealing means in a second bore channel relatively adjacent said cylinder pressure chamber, said second sealing means comprising a resilient annular sealing ring having an internal face bearing in sealed relation against said piston rod portion, said sealing ring having a first side face opposed to said first sealing means generally conforming to the adjacent side wall of said second channel, and said annular sealing ring having a fluid passage means providing communication between said first side face and the opposed side face of said ring at said internal face when said first side face is spaced from said adjacent side wall of said channel, whereby said second sealing means functions as unidirectional pressure seal, wherein said sealing ring first side face seals against said channel adjacent side wall when the hydraulic fluid pressure in said cylinder pressure chamber is greater than the pressure between said sealing means and said second sealing means permitting hydraulic fluid flow into said cylinder pressure chamber through said fluid passage means when the fluid pressure between said sealing means is greater than the pressure in said cylinder chamber.

9. The piston rod seal defined in claim 7, characterized in that the external diameter of said annular sealing ring is less than the internal diameter of said second bore channel at said bottom wall and said ring fluid passage means comprising the space between said ring external surface and said second channel bottom wall and said ring radial groove.

10. The piston rod seal defined in claim 9, characterized in that the external diameter of said sealing ring is less than the internal diameter of said second bore channel at said bottom wall providing fluid communication around said annular sealing ring and through said groove when said side face opposed to said first sealing means is spaced from the adjacent channel side wall.

11. The piston rod seal defined in claim 9, characterized in that the external surface of said annular sealing ring includes a groove communicating between said side faces and said radial groove providing said fluid passage means.

12. A pressure relieved piston rod seal for a piston-cylinder, said cylinder including a piston having a pressure chamber therein, and a piston reciprocal in said cylinder chamber having a rod portion extending out of said cylinder through a bore, said bore having an internal surface conforming generally closely to the exterior surface of said piston rod portion and including two spaced annular channels opening toward said piston rod portion including opposed side walls and a bottom wall, said piston rod seal comprising first and second sealing means located in said cylinder bore channels operating in tandem to seal said cylinder bore, said first sealing means in said bore channel located relatively adjacent the external opening of said bore and bearing in sealed relation against said piston rod portion, and said second sealing means in a second bore channel located relatively adjacent said cylinder chamber, said second sealing means comprising a resilient annular sealing ring having side faces opposed to said second channel side walls and an internal face bearing in sealed relation against said piston rod portion, said sealing ring having a width measured between said side faces which is less than the width of said second channel measured between said side walls, said sealing ring side faces generally conforming to the opposed side walls of said second channel and said sealing ring having a fluid passage means including a radial groove in said sealing ring side face opposed to said cylinder pressure chamber providing communication between the side face of said ring opposed to said first sealing means at said internal face, whereby said second sealing means functions as a unidirectional seal, wherein said side face of said sealing ring opposed to said first sealing means seals against the adjacent side wall of said second channel when the fluid pressure in said cylinder chamber is greater than the pressure between said sealing means and said second sealing means permitting fluid flow through said passage means into said cylinder chamber when the fluid pressure between said sealing means is greater than the pressure in said hydraulic cylinder chamber.

* * * * *